(12) United States Patent
Mittelstadt et al.

(10) Patent No.: US 7,371,481 B2
(45) Date of Patent: May 13, 2008

(54) ELECTRODE HAVING MACROPORES AND MICROPORES THEREIN

(75) Inventors: Laurie S. Mittelstadt, Belmont, CA (US); Patricia A. Beck, Palo Alto, CA (US); Yoocham Jeon, Palo Alto, CA (US); Alfred I-Tsung Pan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 242 days.

(21) Appl. No.: 11/151,096

(22) Filed: Jun. 13, 2005

(65) Prior Publication Data
US 2006/0280996 A1   Dec. 14, 2006

(51) Int. Cl.
*H01M 4/00* (2006.01)
(52) U.S. Cl. .................................... 429/41; 429/40
(58) Field of Classification Search ............ 429/41, 429/40
See application file for complete search history.

(56) References Cited
U.S. PATENT DOCUMENTS

| | | | |
|---|---|---|---|
| 5,759,712 A | 6/1998 | Hockaday | |
| 5,846,669 A | 12/1998 | Smotkin et al. | |
| 6,641,948 B1 | 11/2003 | Ohlsen et al. | |
| 6,720,105 B2 | 4/2004 | Ohlsen et al. | |
| 2002/0028372 A1 | 3/2002 | Ohlsen et al. | |
| 2002/0048703 A1 | 4/2002 | Ohlsen et al. | |
| 2002/0182479 A1 | 12/2002 | Mallari et al. | |
| 2003/0044674 A1 | 3/2003 | Mallari et al. | |
| 2003/0091878 A1 | 5/2003 | Rosenfeld et al. | |
| 2004/0058217 A1 | 3/2004 | Ohlsen et al. | |

OTHER PUBLICATIONS

Pu et al., "A Methanol Impermeable Proton Conducting Composite Electrolyte System", J. Electrochem. Soc., 142 (7): 119-20 ; Jul. 1995.

*Primary Examiner*—Gregg Cantelmo
*Assistant Examiner*—Eugenia Wang

(57) ABSTRACT

An electrode is disclosed. The electrode includes a substrate having macropores therein. A barrier support layer, established on the substrate, has micropores therein. The macropores and at least some of the micropores are substantially lined with an electrolyte layer. A catalyst is in ionic contact with the electrolyte layer. A current collector is in electrical contact with the catalyst. A barrier layer is established on the barrier support layer and is electrically isolated from the current collector.

61 Claims, 3 Drawing Sheets

ELECTRODE HAVING MACROPORES AND MICROPORES THEREIN

BACKGROUND

The present disclosure relates generally to electrodes, and more particularly to electrodes having macropores and micropores therein.

Fuel cells use an electrochemical energy conversion of fuel (including but not limited to hydrogen, propane, methane, carbon monoxide, and the like) and oxidant(s) into electricity and heat. It is anticipated that fuel cells may be able to replace primary and secondary batteries as a portable power supply. In fuel cells, the fuel (usually containing a source of hydrogen) is oxidized to produce (primarily) water and carbon dioxide. Liberated electrons from the oxidation and reduction reactions occurring at the electrodes, result in a useful electrical potential difference and current through the load.

Many fuel cells make use of alternative fuels, such as hydrocarbons or alcohols, which are converted into hydrogen via a chemical process. Electrochemical fuel cells employing alcohols (e.g. ethanol, methanol, etc.) as a fuel are referred to as Direct Alcohol Fuel Cells (DAFC) and more specifically, those employing methanol are referred to as Direct Methanol Fuel Cells (DMFC). In a DMFC, the methanol molecule's carbon-hydrogen and oxygen-hydrogen bonds are broken to generate electrons and protons at the site of the anode. One potential problem with DMFC is that methanol may diffuse or "crossover" from the anode to the cathode via diffusion. If the fuel reaches the cathode, it may adsorb onto the cathode catalyst and react with oxygen, resulting in a parasitic loss of fuel and poisoning the alcohol-intolerant cathode catalyst, thereby decreasing the performance.

Attempts for reducing methanol crossover include: structural modifications of the electrolyte membrane; reduction in the delivered concentration of the fuel; and the addition of a metal hydride barrier layer. Modifying the electrolyte membrane may be difficult due to the relatively high methanol permeability of such membranes. A reduction in the delivered concentration of the fuel may result in reduced catalytic efficiency. Potential problems associated with the metal hydride barrier layer may include cracking and delamination, which may occur as a result of hydration cycling. In addition, the metallic layer may have poor adhesion to a traditional polymer electrolyte membrane, due, at least in part, to the expansion and lack of mechanical integrity of both the metallic layer and solid electrolyte.

As such, it would be desirable to provide an electrode that substantially prevents fuel crossover in a fuel cell while substantially maintaining its efficiency.

SUMMARY

An electrode is disclosed herein. The electrode includes a substrate having macropores therein. A barrier support layer, established on the substrate, has micropores therein. The macropores and at least some of the micropores are substantially lined with an electrolyte layer. A catalyst is in ionic contact with the electrolyte layer. A current collector is in electrical contact with the catalyst. A barrier layer is established on the barrier support layer and is electrically isolated from the current collector.

BRIEF DESCRIPTION OF THE DRAWINGS

Objects, features and advantages of embodiments of the present disclosure will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION

Embodiments of the present disclosure include electrodes, methods of fabricating the same, and fuel cells (non-limitative examples of which include direct alcohol or direct methanol fuel cells) having such electrodes therein. An embodiment of the electrode has a barrier layer that is electrically isolated from a current collector (for example, a current collecting layer (see FIGS. 1E and 2E); a current collecting portion of a substrate (see FIGS. 1D and 2D); a substrate that functions as a current collector (see FIGS. 1D and 2D); or combinations thereof). It is believed that the barrier layer is advantageous in substantially reducing fuel (e.g. alcohol, and in particular methanol) crossover from the anode to the cathode, thus substantially increasing the efficiency and performance of the fuel cell. Embodiments which have the barrier layer electrically isolated from the current collector may advantageously allow a user to control the voltage of the barrier layer independently of the electrode. Without being bound to any theory, it is believed that by having the barrier layer isolated from the current collector, a potential difference may exist across the barrier layer that helps to drive the flow of hydrogen atoms across the barrier layer. In addition, embodiment(s) of the electrode and fuel cell may allow high concentrations of fuel to be used, which advantageously allows substantially higher energy and weight density of the fuel cell.

Figure 1A:
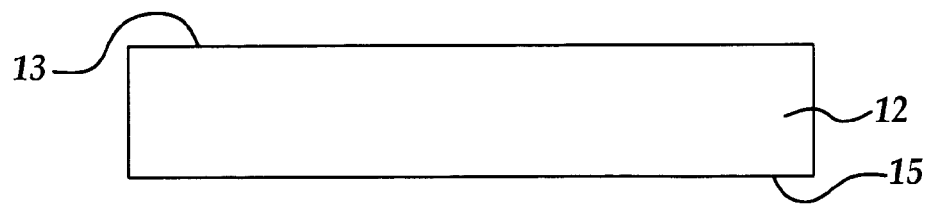
FIGS. 1A through 1E are schematic cross-sectional diagrams of the process of forming embodiments of an electrode.
Figure 1B:
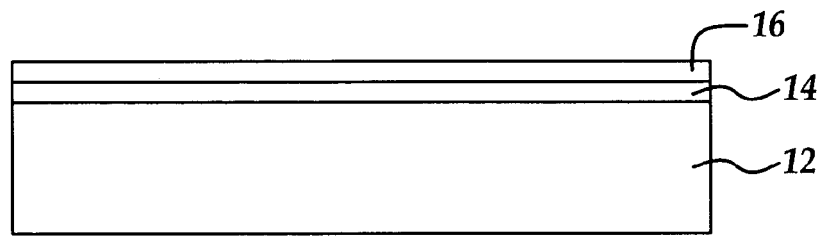
Figure 1C:
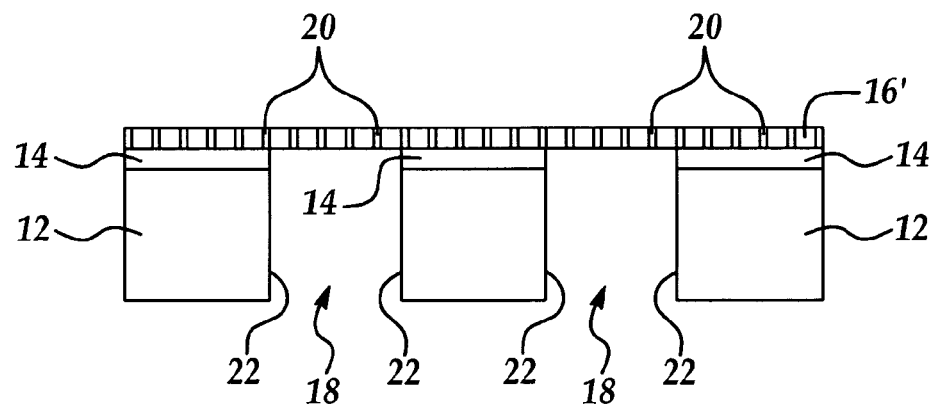
Figure 1D:
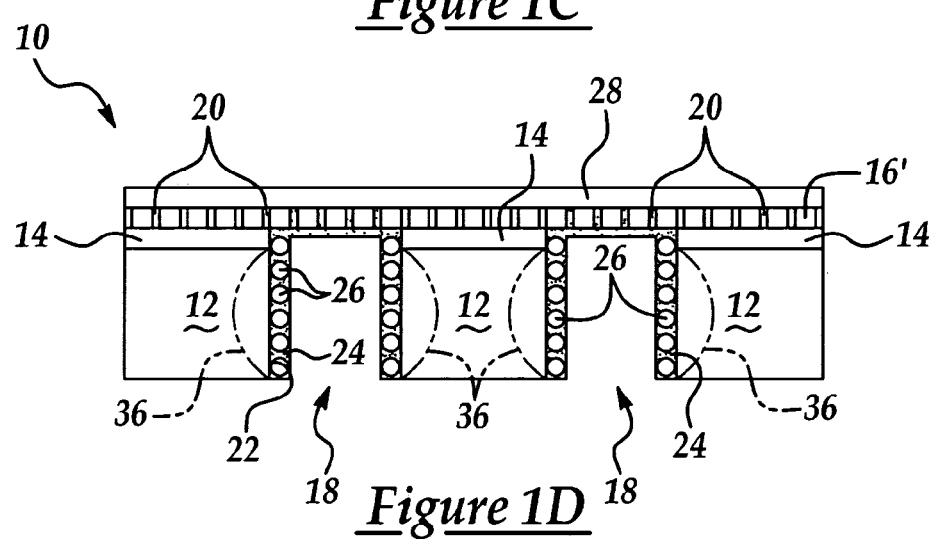
Figure 1E:
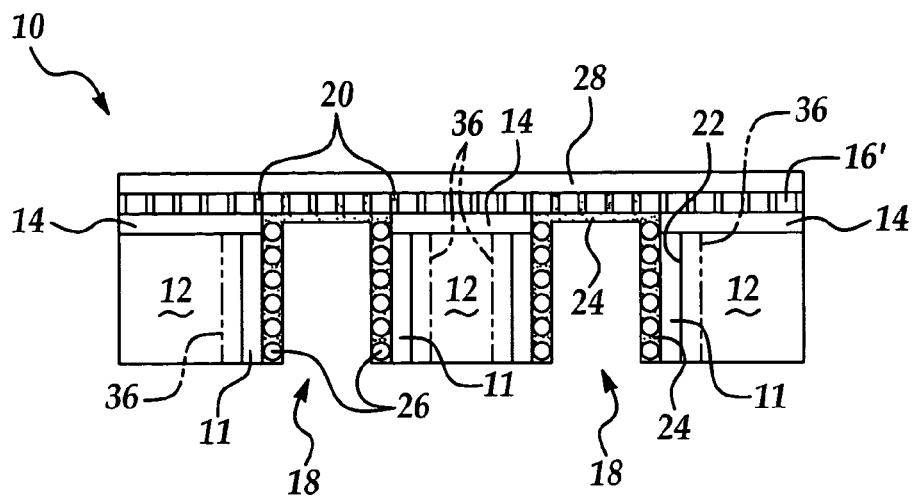

Referring now to FIG. 1A through FIG. 1E, an embodiment of the method of forming alternate embodiments of the electrode 10 (as depicted in FIGS. 1D and 1E) is depicted. It is to be understood that the electrode 10 may be one of a cathode and an anode.

Referring in particular to FIG. 1A, the electrode 10 (as seen in FIG. 1D and FIG. 1E) includes a substrate 12. In one embodiment, all or at least a portion of the substrate 12 functions as a current collector. Another embodiment (discussed further in reference to FIG. 1E) includes a current collecting layer 11. It is to be understood that the current collector is adapted to collect or transmit electronic charge.

In an embodiment, substrate 12 has first and second opposed sides 13, 15. It is to be understood that the substrate 12 may be any suitable material which can support catalyst material(s) and which can undergo physical alteration(s). Examples of such materials include, but are not limited to silicon (non-limitative examples of which include single crystal silicon, polysilicon, and amorphous silicon), silicon on insulator (SOI), dielectrics (non-limitative examples of which include silicon oxides, silicon nitrides, silicon oxynitrides, and silicon carbide), polymers (non-limitative examples of which include conducting and non-conducting polymers), elastomers (non-limitative examples of which include conducting and non-conducting elastomers), alumina (a non-limitative example of which includes sapphire), ceramics, and combinations thereof. One example of such a combination includes a structure having two or more layers of the above-mentioned materials. In an embodiment, a silicon layer is selected, in part, because it may advantageously be compatible with semiconducting processing techniques. In a further embodiment, the substrate 12 is a silicon wafer that is doped such that a portion of the substrate 12 is capable of serving as a current collector for the transmission or collection of an electrical current.

The substrate 12 may have any suitable thickness. In an embodiment, the thickness of the substrate 12 ranges from about 50 µm to about 600 µm. In one non-limitative example, the substrate 12 is about 100 µm. It is to be understood however, that a thicker substrate 12 may be used. Further, the active fuel cell area (macropores 18 having catalyst 26 and electrolyte layer 24 therein) may be etched into the substrate 12. An embodiment of a substrate 12 includes a SOI substrate where the electrode 10 includes a silicon wafer having an insulator layer and an additional silicon layer established thereon. The SOI substrate is similar to that shown in FIG. 1B with the substrate 12 having isolating layer 14 and a barrier support layer 16 established thereon. As such, if a multilayer substrate (such as an SOI substrate) is selected, the additional layers 14, 16 may already be incorporated in the electrode 10.

Figure 2A:
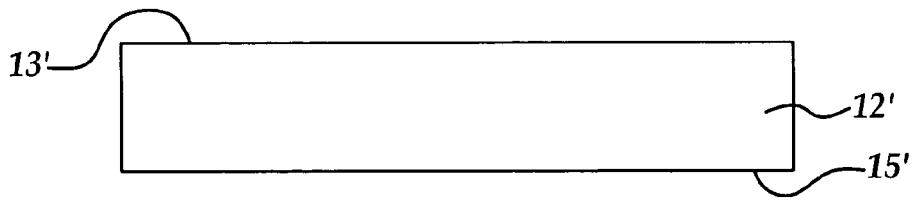
FIGS. 2A through 2E are schematic cross sectional diagrams of the process of forming alternate embodiments of an electrode.
Figure 2B:
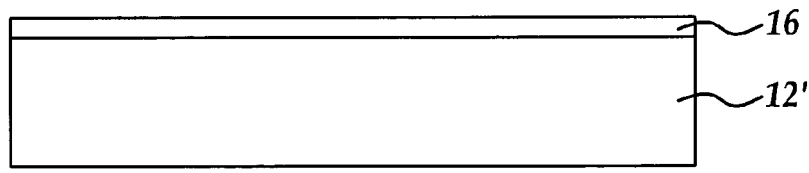

Referring now to FIG. 1B, an isolating layer 14 is established on the first side 13 or the second side 15 of the substrate 12. It is to be understood that the addition of the isolating layer 14 on the substrate 12 is optional and depends, at least in part, on the materials selected for the substrate 12 (or 12' as depicted in FIG. 2A) and the barrier support layer 16. In an embodiment where the substrate 12 is a conducting material (as shown in FIG. 1B), an isolating layer 14 is established thereon and assists in electrically isolating barrier layer 28 from the current collector. In an alternate embodiment where the substrate 12' (as shown in FIG. 2B) and the barrier support layer 16 are different materials and one is non-conducting, an isolating layer 14 is generally not included (as will be discussed further below in reference to FIG. 2B).

In an embodiment, the isolating layer 14 is an oxide. It is to be understood that any suitable process may be used to establish the isolating layer 14. In an embodiment, the isolating layer 14 is established using any suitable formation techniques, such as, for example, plasma enhanced chemical vapor deposition (PECVD), low pressure chemical vapor deposition (LPCVD), physical deposition (e.g. sputtering or evaporation), spin-on-techniques, atomic layer deposition (ALD), self-assembled monolayers (SAM), thermal oxidation, or ion implantation.

It is to be understood that the isolating layer 14 may advantageously act as an etch stop to optimize the independent formation of macropores and micropores (depicted respectively as 18 and 20 in FIG. 1C) in the substrate 12 and barrier support layer 16 (described hereinbelow) of the electrode 10. It is to be further understood that the isolating layer 14 may allow various etch processes to be performed independently of each other on opposed sides of the isolating layer 14 without one etch process substantially interfering with the other. Further, it is to be understood that such etching processes may be performed substantially simultaneously or sequentially. In an embodiment, portions of the isolating layer 14 may be removed during or subsequent to the pore etching processes (see FIG. 1C). It is to be understood that portions of the isolating layer 14 are removed so some of the micropores 20 extend through the barrier layer 16 to the macropores 18.

FIG. 1B also depicts a barrier support layer 16 established on the substrate 12 and on the isolating layer 14. It is to be understood that the terms "established on", "deposited on" and the like are broadly defined herein to encompass a variety of divergent layering arrangements and assembly techniques. These arrangements and techniques include, but are not limited to (1) the direct attachment of one material layer to another material layer with no intervening material layers; and (2) the attachment of one material layer to another material layer with one or more intervening material layers, provided that the one layer being "established on" or "deposited on" the other layer is somehow "supported" by the other layer (notwithstanding the presence of one or more additional intervening material layers). The phrases "directly established on" or "deposited directly on" and the like are broadly defined herein to encompass a situation(s) wherein a given material layer is secured to another material layer without any intervening material layers.

It is to be understood that the barrier support layer 16 is modified to have micropores 20 formed throughout (see reference numeral 16' in FIG. 1C) and is adapted to support a subsequently formed barrier layer 28. As mentioned above, it is to be understood, however, that if a multilayer substrate (e.g. SOI substrate) is selected, the barrier support layer 16 may already be incorporated into the substrate 12.

In an embodiment, the barrier support layer 16 may be formed via any suitable technique, including, but not limited to lamination techniques or wafer bonding techniques.

Referring now to FIG. 1C, and as previously indicated, macropores 18 and micropores 20 are formed in the substrate 12 and in the barrier support layer 16, respectively.

The macropores 18 may be formed in a portion of the substrate 12 by wet or dry etch processes (non-limitative examples of which include reactive ion etching and argon ion milling), laser milling, laser assisted etching, electrochemical etching, molding, and combinations thereof. It is to be understood that any suitable number of macropores 18 may be formed in the substrate 12. Generally, the macropores 18 are formed in a side 13, 15 of the substrate 12 opposed to the side 15, 13 upon which the isolating layer 14 is established.

The macropores 18 may be used as channels for oxygen gas, air, liquid oxidants and the like, or fuel to enter the electrode 10 (e.g. a cathode or anode, respectively) and for water and/or water vapor at the cathode or carbon dioxide at the anode to exit the electrode 10. Therefore, it is to be understood that the macropores 18 may be large enough to allow the flow of such materials, and to allow the ingress and egress of such materials with substantially minimal restriction. In an embodiment, each of the macropores 18 has a diameter ranging from about 1 µm to about 500 µm, and in another embodiment, the diameter ranges from about 10 µm to about 100 µm.

The micropores 20 may be formed in the barrier support layer 16, to form the microporous barrier support layer 16'. It is to be understood that any suitable forming process may be used. In an embodiment, the micropores 20 are formed by at least one of electrochemical etching, focused ion beam etching, or laser assisted gas etching. In an embodiment where the micropores 20 are relatively large, the techniques described herein for forming macropores 18 may be employed. In an embodiment, the average diameter of the micropores 20 ranges from about 0.1 µm to about 2 µm. In a further embodiment, the micropores 20 have an average diameter ranging from about 0.1 µm to about 1 µm.

In a non-limitative example, the microporous barrier support layer 16' is formed by depositing a silicon layer on the isolating layer 14 and etching the micropores 20 throughout the silicon layer. It is to be understood that any suitable material(s) may be used to form the microporous barrier support layer 16'. In an embodiment, a silicon layer is selected, in part, because it is compatible with semiconductor processing techniques.

Referring now to FIG. 1D, the macropores 18 have a surface 22 that may be substantially lined or filled with an electrolyte layer 24. Further, some of the micropores 20 may also be substantially lined or filled with the electrolyte layer 24. In an embodiment of the method, substantially lining the macropores 18 and/or micropores 20 with the electrolyte layer 24 is accomplished by coating the respective pores 18, 20 with an electrolyte solution and heating. It is to be understood that the electrolyte layer 24 is in ionic contact with a catalyst 26.

Further, the electrolyte layer 24 may be any suitable material. In an embodiment, the electrolyte layer 24 is a sulfonated fluoropolymer, such as a perfluorosulfonic acid polymer, which is commercially available under the tradename NAFION, from DuPont, located in Circleville, Ohio.

Other examples of potential electrolytes may include, but are not limited to sulfonated derivatives of a polymer that includes a lyotropic liquid crystalline polymer, such as a polybenzazole (PBZ) or polyaramid (PAR or KEVLAR which is commercially available from DuPont) polymers. Non-limitative examples of polybenzazole polymers include polybenzoxazole (PBO), polybenzothiazole (PBT) and polybenzimidazole (PBI) polymers. Examples of polyaramid polymers include, but are not limited to polyparaphenylene terephthalimide (PPTA) polymers.

The polymeric electrolyte layer 24 may also include a sulfonated derivative of a thermoplastic or thermoset aromatic polymer. Non-limitative examples of the aromatic polymers include polysulfones (non-limitative examples of which include polyethersulfone (PES), polyetherethersulfone (PEES), polyarylsulfone, polyarylethersulfone (PAS), polyphenylsulfone (PPSU) and polyphenylenesulfone (PPSO$_2$) polymers); polyimides (non-limitative examples of which include polyetherimide and fluorinated polyimides); polyphenylene oxides (PPO); polyphenylene sulfoxides (PPSO); polyphenylene sulfides (PPS); polyphenylene sulfide sulfones (PPS/SO$_2$); polyparaphenylenes (PPP); polyphenylquinoxalines (PPQ); polyarylketones (PK); polyetherketones (non-limitative examples of which include polyetheretherketone (PEEK), polyetherketone-ketone (PEKK), polyetheretherketoneketone (PEEKK) and polyetherketoneetherketone-ketone (PEKEKK)), inorganic acids solutions (a non-limitative example of which includes sulfuric acid and phosphoric acid in water), alkaline solutions (a non-limitative example of which includes potassium hydroxide in water), and combinations thereof.

It is to be understood that the polymeric electrolyte layer 24 may also include a sulfonated derivative of a non-aromatic polymer, such as a perfluorinated ionomer. Examples of such ionomers include, but are not limited to carboxylic, phosphonic, or sulfonic acid substituted perfluorinated vinyl ethers.

Still further, the electrolyte layer 24 may include a sulfonated derivative of blended polymers, such as a blended polymer of PEKK and PEEK.

The electrolyte layer 24 may have a composite layer structure including two or more layers. Non-limitative examples of composite layer structures are NAFION or PBI membranes coated with sulfonated polyetheretherketone (sPEEK) or sulphonated polyetheretherketone-ketone (sPEEKK). The layers in a composite layer structure may be blended layers, unblended layers, and/or a combination thereof.

In an embodiment, the pore 18, 20 surfaces may be coated with an electrolyte layer to protect the surfaces and substantially improve the wettability of the respective pores 18, 20. The micropores 20 and macropores 18 may be filled with a liquid electrolyte, such as an acid solution or an alkaline solution.

A catalyst 26 may be established such that it is in ionic contact with the electrolyte layer 24 and is in electrical contact with the current collector (whether the current collector is all or part of the substrate 12 (FIG. 1D) or is a separate current collecting layer 11 (FIG. 1E)). It is to be understood that the catalyst 26 may include any suitable cathode or anode material. In an embodiment, the catalyst 26 is platinum, ruthenium, osmium, gold, nickel, cobalt, nickel oxide, alloys thereof, and/or combinations thereof.

The catalyst 26 may be established by any suitable means. In an embodiment, the catalyst 26 is deposited by electroplating, electroless deposition, chemisorption, sputtering, self-assembled monolayer (SAM) deposition, and/or evaporation.

In an embodiment, the catalyst 26 may be established on a portion of the substrate 12 or current collector that has been modified to substantially increase the catalyst 26 surface area. In another embodiment, the catalyst 26 may be supported on small particles (a non-limitative example of which includes nanoparticles, which in one embodiment can be carbon nanoparticles) that are established on the substrate 12 or current collector, in order to substantially increase the catalyst 26 surface area. In still a further embodiment, the surface of a barrier layer 28 (described hereinbelow) may be modified (e.g. roughened) and catalyst 26 applied thereto in order to assist in driving a desired reaction.

FIG. 1D also depicts a barrier layer 28 established on the microporous barrier support layer 16', such that the barrier layer 28 is mechanically supported by and may be in electrical contact with the barrier support layer 16'. It is to be understood that the barrier layer 28 is established such that at least a portion of the barrier layer 28 forms a substantially continuous film substantially covering at least some of the micropores 20 of the barrier support layer 16. It is to be understood that the filled or partially filled micropores 20 provide an ionic connection through the barrier support layer 16.

It is to be understood that, in a non-limitative example, the thickness of the barrier layer 28 may be substantially the same as the average diameter of the micropores 20 such that when established, the barrier layer 28 is substantially continuous. It is to be understood that the relative thickness of layer 28 and the size of micropores 20 may facilitate the continuity of layer 28. In an embodiment, the thickness of the barrier layer 28 ranges from about 0.1 µm to about 2 µm. In a further embodiment, the thickness of barrier layer 28 ranges from about 0.1 µm to about 1 µm. The barrier layer 28 may allow for low cost production of the electrode 10 and substantially high hydrogen transport across the barrier layer 28.

The barrier layer 28 is substantially permeable to hydrogen atoms and/or protons and is substantially impermeable to large fuel molecules (i.e. any fuel other than hydrogen atoms or hydrogen molecules, e.g. reductants such as alcohol and methanol and oxidants such as oxygen gas or air). In an embodiment, the barrier layer 28 substantially prevents large molecule reductant-containing fuels from directly contacting the cathode. In another embodiment, the barrier layer 28 substantially prevents large molecule oxidant-containing fuels from directly contacting the anode.

While the barrier layer 28 is physically and rigidly connected to the catalyst 26 via the microporous barrier support layer 16', it is also electrically isolated from the current collector. The electrical isolation of the current collector from the barrier layer 28 may advantageously allow the voltage of the barrier layer 28 to be controlled independently of the electrode 10.

In an embodiment, the barrier layer 28 is a metal. Examples of suitable metals include, but are not limited to palladium, silver, niobium, tantalum, vanadium, gold, alloys thereof, hydrides thereof, or combinations thereof. The barrier layer 28 may be established by any suitable technique, including, but not limited to electroplating, sputtering, thermal evaporation, e-beam evaporation, electroless deposition, and/or a combination thereof. In an embodiment, the barrier layer 28 is first formed on another substrate and is then transferred to the substrate 12 of interest (this may be referred to as a decal process).

It is to be understood that the embodiment of the electrode 10 depicted in FIG. 1D has all or a portion 36 (shown in phantom) of the substrate 12 functioning as the current collector that is in electrical contact with the catalyst 26.

Referring now to FIG. 1E, an alternate embodiment of the electrode 10 is depicted. In this embodiment, a current collecting layer 11 is established adjacent to, and in electrical contact with the catalyst 26. In an alternate embodiment, in addition to current collecting layer 11, all or a portion 36 (shown in phantom) of the substrate 12 may function as the current collector.

FIGS. 2A through 2E depict an embodiment of forming alternate embodiments of the electrode 10 without the isolating layer 14. It is to be understood that previously described materials and techniques may be employed to form these embodiments.

FIG. 2A depicts a substrate 12' having two opposed sides 13', 15', and FIG. 2B depicts a barrier support layer 16 established directly on one of the two opposed sides 13', 15' of the substrate 12'. In this embodiment, either the substrate 12' or the barrier support layer 16 is formed of a non-conducting material. Generally, in this embodiment, the substrate 12' and the barrier support layer 16 are also different materials. Without being bound to any theory, it is believed that a non-conductive substrate 12' and/or a non-conductive barrier support layer 16, which also allows for the formation of macropores 18 in the substrate 12' and/or micropores 20 in the barrier support layer 16 without substantial alteration of the physical or chemical properties of the substrate 12' and/or of the barrier support layer 16, may be processed to form macropores 18 and micropores 20 without the isolation layer 14.

Figure 2C:
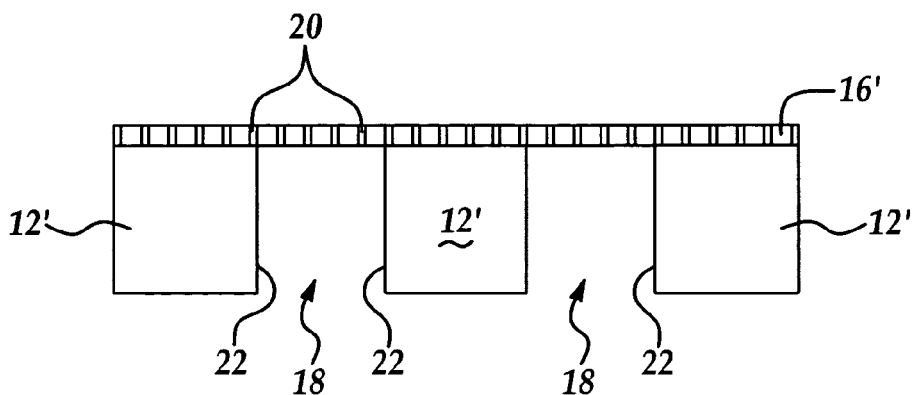

FIG. 2C illustrates the macropores 18 and micropores 20 formed in the substrate 12' and barrier support layer 16, respectively.

Figure 2D:
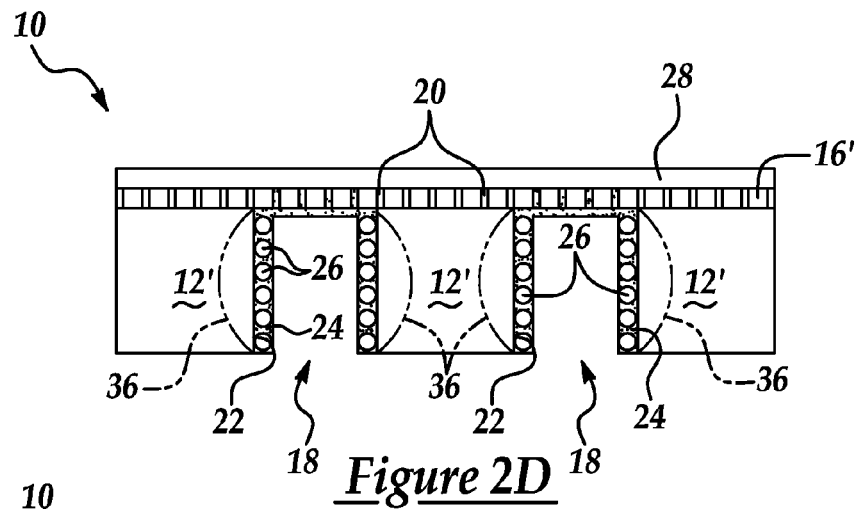

FIG. 2D depicts an embodiment of the electrode 10 having all or a portion 36 (shown in phantom) of the substrate 12' that functions as the current collector. As previously described, the portion of the substrate 12' that functions as the current collector is in electrical contact with the catalyst 26, which in turn is in ionic contact with the electrolyte layer 24.

Figure 2E:
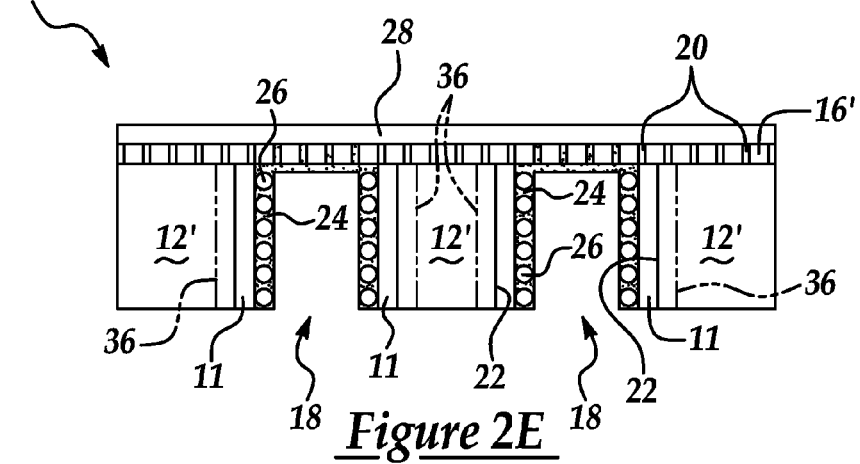

FIG. 2E depicts an alternate embodiment of the electrode 10 having current collecting layer 11. In an alternate embodiment, in addition to current collecting layer 11, all or a portion 36 (shown in phantom) of the substrate 12 may function as the current collector. It is to be understood that portion 36 may be of any suitable size, shape, or configuration.

Figure 3:
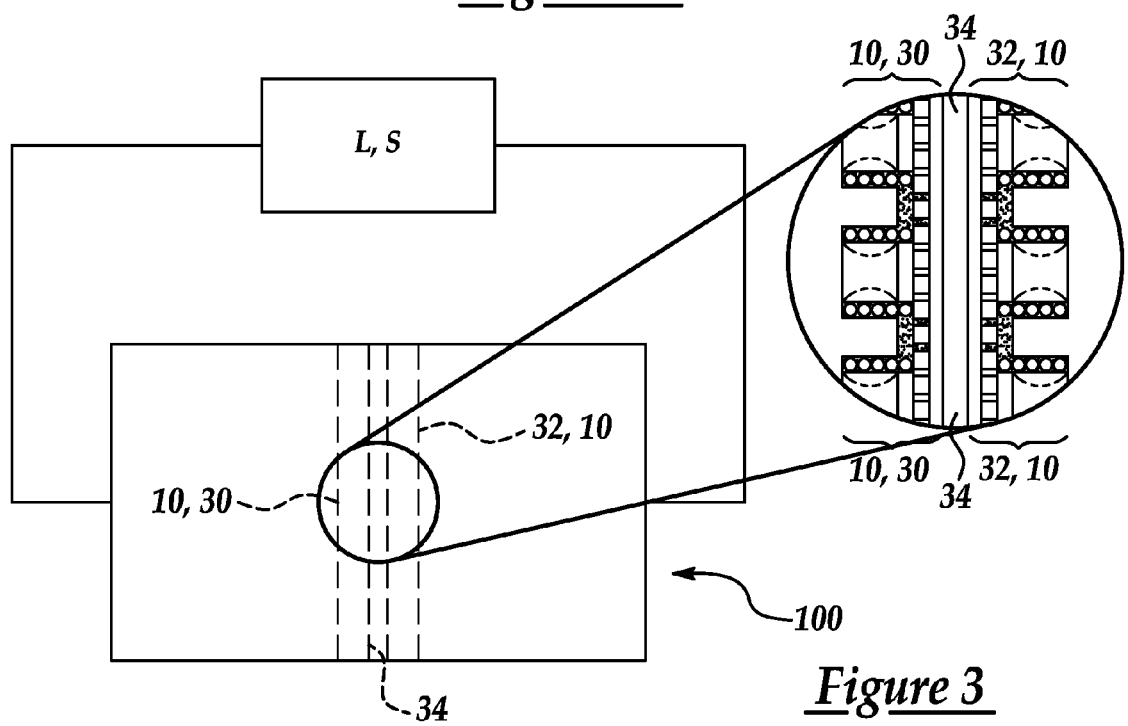
FIG. 3 is a schematic view of an embodiment of a fuel cell.

Referring now to FIG. 3, an embodiment of a fuel cell 100 of the present disclosure includes a cathode 32 (e.g. electrode or counter electrode), an anode 30 (e.g. counter electrode or electrode), and an electrolyte 34 established between the cathode 32 and the anode 30 and in ionic contact therewith. It is to be understood that the anode 30 and/or the cathode 32 may be an embodiment of the electrode 10 as disclosed herein.

FIG. 3 is a simplified schematic diagram of a dual chamber fuel cell 100. In the fuel cell 100 embodiments of the present disclosure, oxidants are carried to the cathode 32, and reductants are carried to the anode 30. In an embodiment, the reductants are liquid alcohols, such as methanol, and the oxidants are one of oxygen gas, ambient air containing oxygen, hydrogen peroxide, and combinations thereof. It is to be understood that any suitable fuel/reductant may be used with the fuel cell 100 of the present disclosure. In an embodiment, the fuel/reactant is selected from at least one of hydrogen, methane, ethane, propane, butane, pentane, methanol, ethanol, higher straight chain or mixed hydrocarbons, for example, natural gas, sodium borohydride solutions, water and combinations thereof. Suitable fuels may be chosen for their suitability for internal direct reformation, suitable vapor pressure within the operating temperature range of interest, and like parameters.

In an embodiment, the electrode(s) 30, 32 of fuel cell 100 is operatively connected to an electrical load L and/or to electrical storage device S. The electrical load L may include many devices, including, but not limited to any or all of: computers, portable and non-portable electronic appliances (e.g. portable digital assistants (PDAs), portable power tools, etc.), and portable and non-portable communication devices. The electrical storage device S may include, as non-limitative examples, any or all of capacitors, batteries, and power conditioning devices. Some exemplary power conditioning devices include uninterruptible power supplies, DC/AC converters, DC voltage converters, voltage regulators, current limiters, etc.

It is also contemplated that the fuel cell 100 of the present disclosure may, in some instances, be suitable for use in the transportation industry, e.g. to power automobiles, and in the utilities industry, e.g. within power plants.

While several embodiments have been described in detail, it will be apparent to those skilled in the art that the disclosed embodiments may be modified. Therefore, the foregoing description is to be considered exemplary rather than limiting.

What is claimed is:

1. An electrode, comprising:
a substrate having macropores therein;
a barrier support layer having micropores therein, the barrier support layer established on the substrate;
an electrolyte layer substantially lining the macropores and at least some of the micropores;
a catalyst in ionic contact with the electrolyte layer;
a current collector in electrical contact with the catalyst; and
a barrier layer established on the barrier support layer, the barrier layer being electrically isolated from the current collector.

2. The electrode of claim 1 wherein the barrier layer is a substantially continuous layer over the barrier support layer, at least a portion of the barrier layer substantially covering at least some of the micropores, wherein the barrier layer forms a film established on the barrier support layer.

3. The electrode of claim 2 wherein the barrier layer has a thickness that is substantially the same as an average diameter of the micropores.

4. The electrode of claim 3 wherein each of the thickness of the barrier layer and the average diameter of the micropores ranges from about 0.1 μm to about 2 μm.

5. The electrode of claim 4 wherein each of the thickness of the barrier layer and the average diameter of the micropores ranges from about 0.1 μm to about 1 μm.

6. The electrode of claim 1 wherein the electrode is a cathode adapted to be used in a direct alcohol fuel cell system.

7. The electrode of claim 6 wherein the macropores are adapted to allow oxidants to enter the cathode and water vapor to exit the cathode.

8. The electrode of claim 1 wherein the electrode is a cathode and wherein the barrier layer substantially prevents large molecule reductant fuel from directly contacting the cathode.

9. The electrode of claim 1 wherein the electrode is an anode and wherein the barrier layer substantially prevents large molecule oxidants from directly contacting the anode.

10. The electrode of claim 1 wherein the electrode is an anode and wherein the macropores are adapted to allow reductants to enter the anode and carbon dioxide to exit the anode.

11. The electrode of claim 1 wherein the electrode is a cathode adapted to be used in a direct methanol fuel cell system.

12. The electrode of claim 1 wherein the substrate is at least one of silicon, silicon on insulator, dielectrics, polymers, elastomers, alumina, ceramics, and layers thereof.

13. The electrode of claim 1 wherein at least a portion of the substrate is the current collector.

14. The electrode of claim 1 wherein the substrate is the current collector.

15. The electrode of claim 1 wherein the current collector is a current collecting layer established adjacent to the catalyst.

16. The electrode of claim 1 wherein the barrier layer comprises at least one of palladium, silver, niobium, tantalum, vanadium, gold, alloys thereof, hydrides thereof, and combinations thereof.

17. The electrode of claim 1 wherein the barrier layer is substantially permeable to hydrogen atoms and is substantially impermeable to large molecule fuel.

18. The electrode of claim 1 wherein each of the macropores has a diameter ranging from about 1 μm to about 500 μm.

19. The electrode of claim 1 wherein the macropores are formed into at least a portion of the substrate.

20. The electrode of claim 1 wherein the catalyst is established on at least some of the current collector.

21. The electrode of claim 1 wherein the catalyst comprises at least one of platinum, ruthenium, osmium, gold, nickel, cobalt, nickel oxide, alloys thereof, and combinations thereof.

22. The electrode of claim 1, further comprising an isolating layer established between the substrate and at least a portion of the microporous barrier support layer.

23. The electrode of claim 22 wherein the isolating layer is an oxide.

24. The electrode of claim 1 wherein the electrolyte layer is a sulfonated fluoropolymer.

25. The electrode of claim 1, further comprising carbon nanoparticles established on one of the current collector and the substrate, wherein the catalyst is supported on the carbon nanoparticles.

26. A fuel cell, comprising:
at least one electrode operatively disposed in the fuel cell, the electrode comprising:
a substrate having macropores therein;
a barrier support layer having micropores therein, the barrier support layer established on the substrate;
an electrolyte layer substantially lining the macropores and at least some of the micropores;
a catalyst in ionic contact with the electrolyte layer;
a current collector in electrical contact with the catalyst; and
a barrier layer established on the barrier support layer, the barrier layer being electrically isolated from the current collector;
an electrode counter to the at least one electrode; and
an electrolyte established between, and in ionic contact with the at least one electrode and the counter electrode.

27. The fuel cell of claim 26 wherein the barrier layer is a substantially continuous layer over the barrier support layer, at least a portion of the barrier layer substantially covering at least some of the micropores, wherein the barrier layer forms a film established on the barrier support layer.

28. The fuel cell of claim 27 wherein the barrier layer has a thickness that is substantially the same as or larger than an average diameter of the micropores.

29. The fuel cell of claim 28 wherein each of the thickness of the barrier layer and the average diameter of the micropores ranges from about 0.1 μm to about 2 μm.

30. The fuel cell of claim 29 wherein each of the thickness of the barrier layer and the average diameter of the micropores ranges from about 0.1 μm to about 1 μm.

31. The fuel cell of claim 26 wherein the at least one electrode is a cathode adapted to be used in a direct alcohol fuel cell system.

32. The fuel cell of claim 31 wherein the macropores are adapted to allow oxidants to enter the cathode and water vapor to exit the cathode.

33. The fuel cell of claim 31 wherein the barrier layer substantially prevents large molecule reductant fuel from directly contacting the cathode.

34. The fuel cell of claim 26 wherein the at least one electrode is an anode and wherein the macropores are adapted to allow reductants to enter the anode and carbon dioxide to exit the anode.

35. The fuel cell of claim 34 wherein the barrier layer substantially prevents large molecule oxidants from directly contacting the anode.

36. The fuel cell of claim 26 wherein the at least one electrode is a cathode adapted to be used in a direct methanol fuel cell system.

37. The fuel cell of claim 26 wherein the substrate is at least one of silicon, silicon on insulator, dielectrics, polymers, elastomers, alumina, ceramics, and layers thereof.

38. The fuel cell of claim 26 wherein the barrier layer comprises at least one of palladium, silver, niobium, tantalum, vanadium, gold, alloys thereof, hydrides thereof, and combinations thereof.

39. The fuel cell of claim 26 wherein the barrier layer is substantially permeable to hydrogen atoms and is substantially impermeable to large fuel molecules.

40. The fuel cell of claim 26 wherein each of the macropores has a diameter ranging from about 1 μm to about 500 μm.

41. The fuel cell of claim 26 wherein the macropores are formed into at least a portion of the substrate.

42. The fuel cell of claim 26 wherein the catalyst is established on at least some of the current collector.

43. The fuel cell of claim 26 wherein the catalyst comprises at least one of platinum, ruthenium, osmium, gold, nickel, cobalt, nickel oxide, alloys thereof, and combinations thereof.

44. The fuel cell of claim 26, further comprising an isolating layer established between the substrate and at least a portion of the barrier support layer.

45. The fuel cell of claim 44 wherein the isolating layer comprises an oxide.

46. The fuel cell of claim 26 wherein the electrolyte layer is a sulfonated fluoropolymer.

47. An electronic device, comprising:
a load; and
the fuel cell of claim 26 connected to the load.

48. A method for fabricating an electrode, comprising:
forming a plurality of macropores into a side of a substrate;
establishing a microporous barrier support layer on a side of the substrate opposed to the side into which the macropores are formed;
substantially lining the macropores and at least some micropores with an electrolyte layer;
establishing a catalyst in ionic contact with the electrolyte layer;
establishing a current collector in electrical contact with the catalyst; and
establishing a barrier layer on the microporous barrier support layer, wherein the barrier layer is electrically isolated from the current collector.

49. The method of claim 48, further comprising increasing an effective surface area of the catalyst by supporting the catalyst on nanoparticles prior to establishing the catalyst in electrical contact with the current collector.

50. The method of claim 48 wherein establishing the barrier layer includes forming a substantially continuous layer over the micropores in the microporous barrier support layer, and wherein the barrier layer forms a film established on the microporous barrier support layer.

51. The method of claim 48 wherein the electrode is one of a cathode and an anode adapted to be used in a direct alcohol fuel cell system.

52. The method of claim 51 wherein the electrode is a cathode, wherein the macropores are adapted to allow oxidants to enter the cathode and water vapor to exit the cathode, and wherein the barrier layer substantially prevents large molecule reductant fuel from directly contacting the cathode.

53. The method of claim 51 wherein the electrode is an anode, wherein the macropores are adapted to allow reductants to enter the anode and carbon dioxide to exit the anode, and wherein the barrier layer substantially prevents large molecule oxidants from directly contacting the anode.

54. The method of claim 48 wherein forming the plurality of macropores is accomplished by at least one of dry etching, wet etching, laser milling, laser assisted etching, electrochemical etching, and molding.

55. The method of claim 48, further comprising establishing an isolating layer between the substrate and the microporous barrier support layer, and wherein the isolating layer acts as an etch stop when forming the plurality of macropores.

56. The method of claim 55 wherein the microporous barrier support layer is established on the isolating layer and wherein establishing the microporous barrier support layer is accomplished by establishing a silicon layer and etching a plurality of micropores throughout the silicon layer.

57. The method of claim 56 wherein the isolating layer acts as an etch stop when etching the plurality of micropores.

58. The method of claim 48 wherein establishing the barrier layer is accomplished by electroplating, sputtering, thermal evaporation, e-beam evaporation, a transfer process, or electroless deposition.

59. The method of claim 48 wherein substantially lining the macropores and micropores with the electrolyte layer is accomplished by coating the respective pores with an electrolyte solution and heating.

60. The method of claim 55 wherein establishing the isolating layer is accomplished by at least one of plasma enhanced chemical vapor deposition, low pressure chemical vapor deposition, sputtering, evaporation, spin-on-techniques, atomic layer deposition, self-assembled monolayers, thermal oxidation, and ion implantation.

61. The method of claim 48 wherein establishing the barrier layer is accomplished by transferring the barrier layer from another substrate.

* * * * *